Nov. 8, 1927.
G. T. RANDOL
1,648,193
CONTROL MEANS FOR GEAR SHIFTING MECHANISMS
Filed March 23, 1923     5 Sheets-Sheet 2
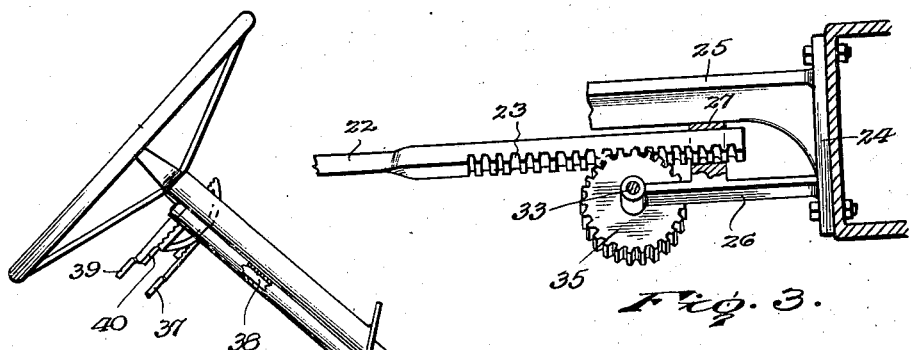
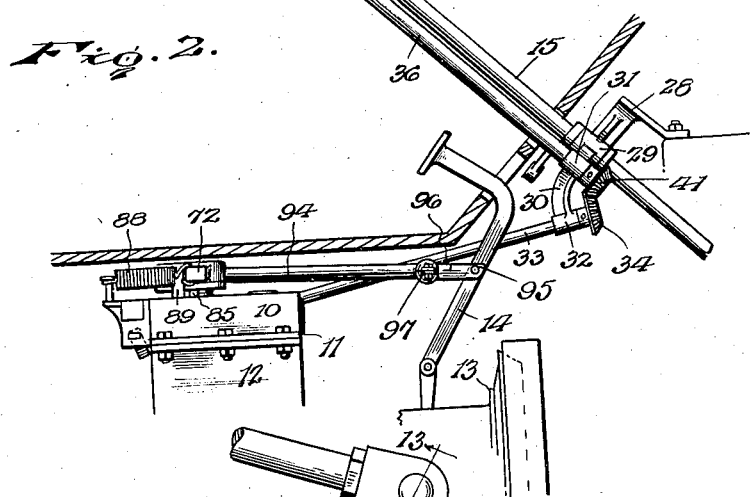
Inventor
G. T. Randol.
By
Lacey & Lacey, Attorneys Nov. 8, 1927.  
G. T. RANDOL  
1,648,193  
CONTROL MEANS FOR GEAR SHIFTING MECHANISMS  
Filed March 23, 1923  5 Sheets-Sheet 3
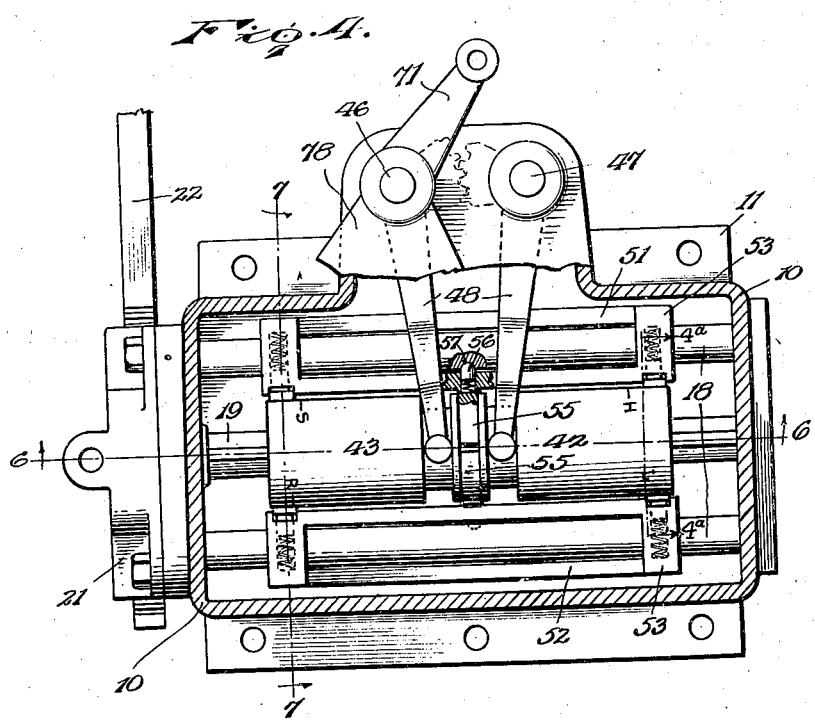
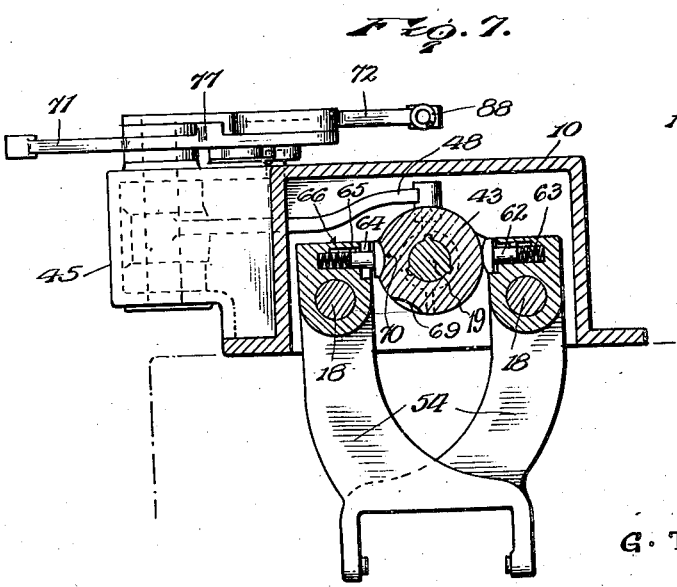
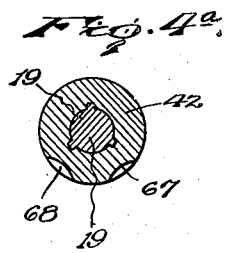
Inventor  
G. T. Randol.  
By  
Lacy & Lacy, Attorneys Nov. 8, 1927.  
G. T. RANDOL  
1,648,193  
CONTROL MEANS FOR GEAR SHIFTING MECHANISMS  
Filed March 23, 1923   5 Sheets-Sheet 4
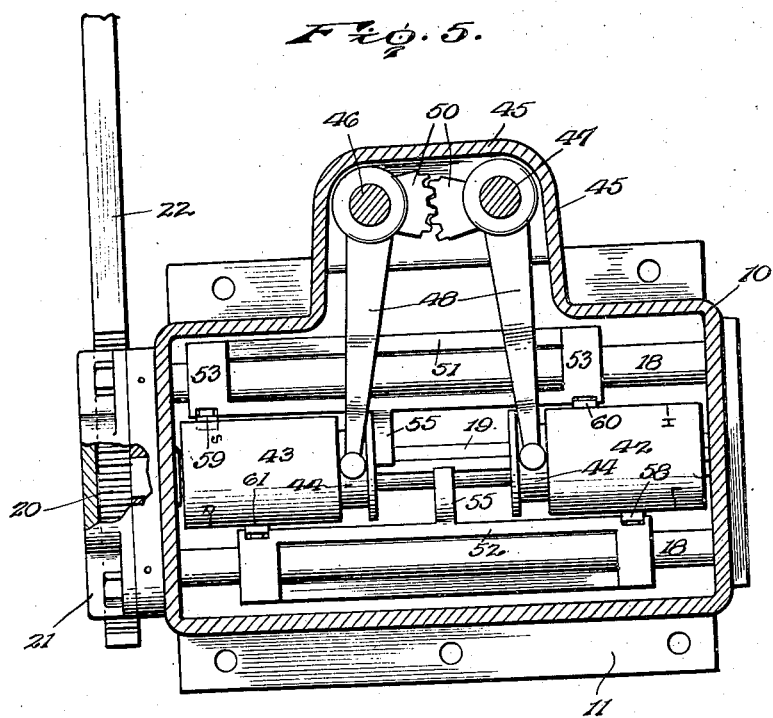
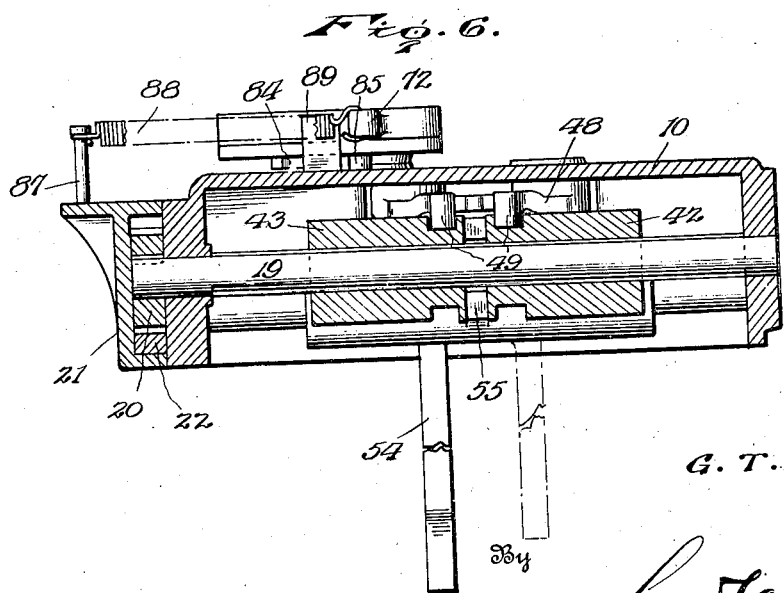
Inventor  
G. T. Randol.  
By  
Attorneys Nov. 8, 1927.
G. T. RANDOL
1,648,193
CONTROL MEANS FOR GEAR SHIFTING MECHANISMS
Filed March 23, 1923    5 Sheets-Sheet 5
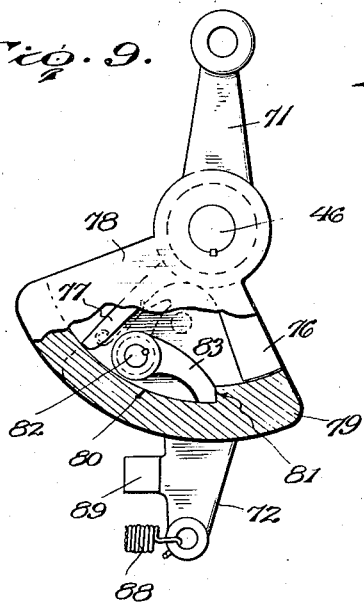
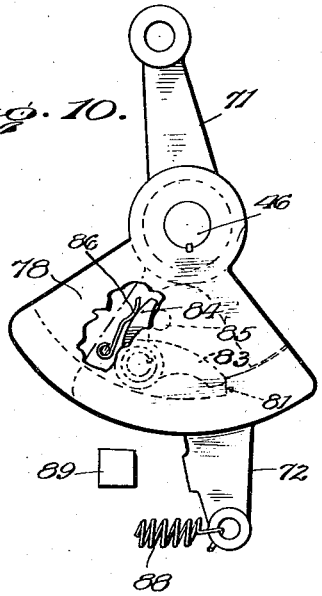
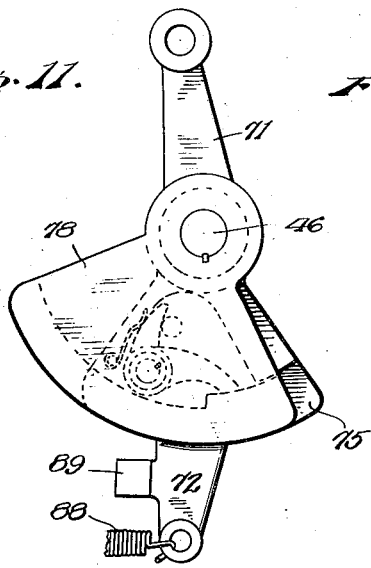
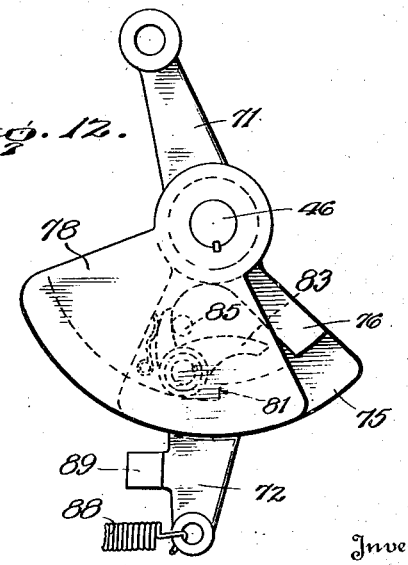
Inventor
G. T. Randol.
By Lacey & Lacey, Attorneys Patented Nov. 8, 1927.

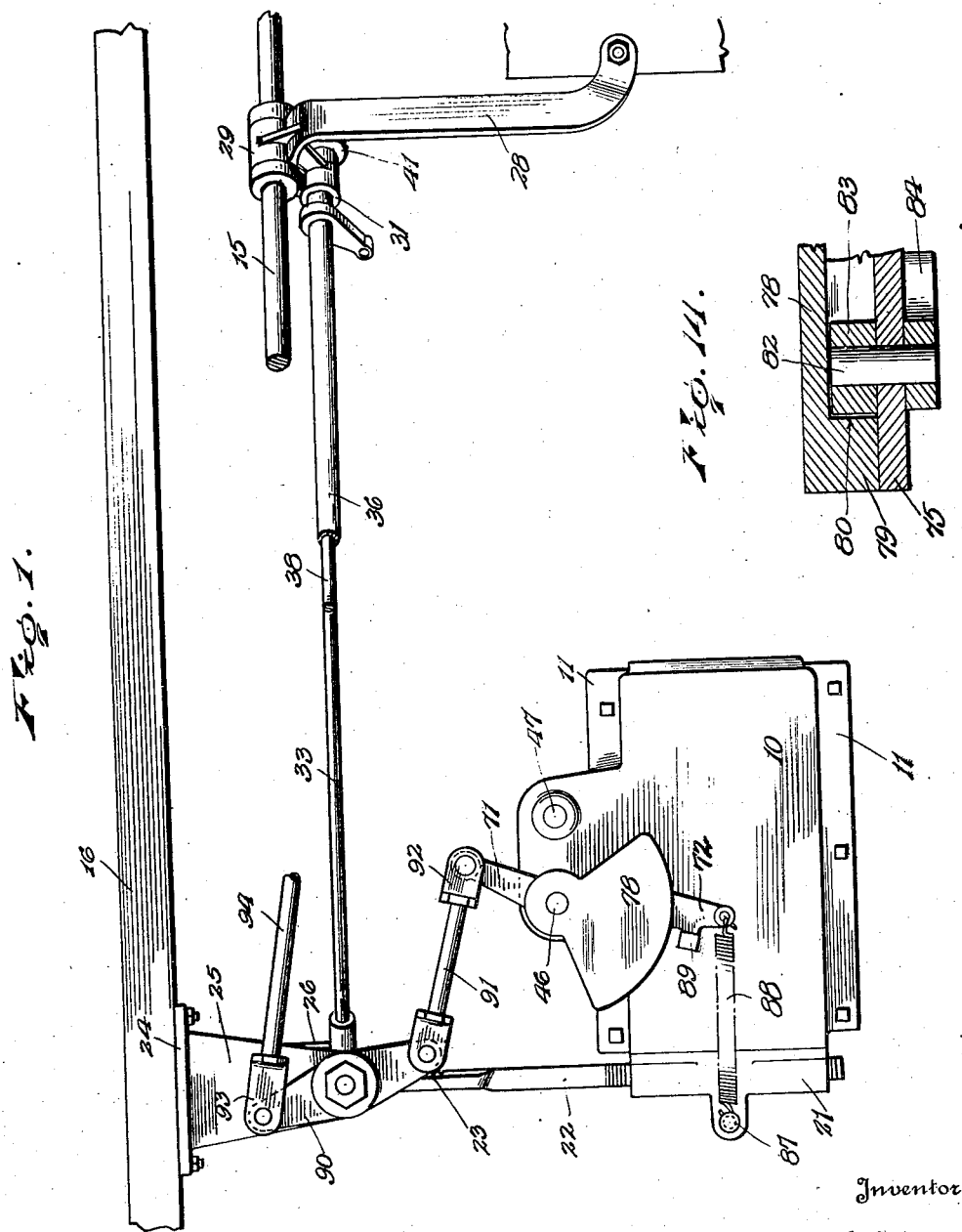

1,648,193

UNITED STATES PATENT OFFICE.

GLENN T. RANDOL, OF MARMADUKE, ARKANSAS, ASSIGNOR OF ONE-HALF TO SOL S. STEINBERG, OF PARAGOULD, ARKANSAS.

CONTROL MEANS FOR GEAR-SHIFTING MECHANISMS.

Application filed March 23, 1923. Serial No. 627,096.

This invention relates to an improved control means for gear shifting mechanisms of the general character disclosed in my pending application for a similar invention filed October 25, 1922, Serial No. 596,838.

The invention seeks, among other objects, to provide in conjunction with a mechanism wherein a power spring is employed to shift the speed gears, means whereby either a quick shift or a shift retarded as desired may be made.

The invention seeks, as a further object in this connection, to provide means whereby the rapidity of the shifting of any gear may be controlled by the operator through the clutch pedal of the vehicle.

And the invention seeks, as a still further object, to provide in conjunction with a mechanism wherein the speed gears are shifted to neutral position by the clutch pedal, means whereby the pedal may, after any gear has reached neutral position, be further shifted forwardly without hindrance.

Other and incidental objects will appear hereinafter.

In the drawings:

Figure 1 is a fragmentary plan view showing the mechanism of the present invention applied, Figure 2 is a fragmentary elevation also showing the mechanism applied, Figure 3 is a fragmentary sectional view showing the structural details of the selector setting mechanism, Figure 4 is a horizontal sectional view through the selector casing employed, this view showing the selectors shifted for neutralizing the gears of the transmission, Figure 4ª is a detail sectional view on the line 4ª—4ª of Figure 4, looking in the direction of the arrows, Figure 5 is a view similar to Figure 4, showing the position of the parts when moved to render the second speed gear of the transmission active, Figure 6 is a vertical longitudinal sectional view on the line 6—6 of Figure 4, looking in the direction of the arrows, Figure 7 is a transverse sectional view on the line 7—7 of Figure 4, looking in the direction of the arrows, Figures 8 to 12 inclusive are detail plan views showing different positions of the companion actuating levers forming the particular subject matter of the present improvements, Figure 13 is a detail sectional view on the line 13—13 of Figure 8, looking in the direction of the arrows, and Figure 14 is a detail sectional view on the line 14—14 of Figure 8, looking in the direction of the arrows.

In order to clearly bring out the function and operation of the present improvements it has been necessary to illustrate a considerable portion of the structure shown in my prior application referred to. However, since such structure is described in detail in said prior application, it is unnecessary to minutely dwell thereon and, therefore, such of the present showing as is identical with that shown in the prior case will be described only generally.

The numeral 10 indicates a casing which is provided with flanges 11 by which the casing is, as shown in Figure 2, bolted to the transmission housing 12 of the vehicle, the housing being conventionally illustrated and containing the usual transmission gears. The clutch of the vehicle is conventionally illustrated at 13 and the clutch pedal at 14 while the steering post is indicated at 15, the steering post being mounted at the left side of the vehicle near the adjacent side bar 16 of the vehicle frame. Extending longitudinally of the casing 10 are stationary rods 18 midway between which is mounted a rotatable selector shaft 19 carrying a pinion 20 at one end thereof. A gear housing 21 is mounted to enclose said pinion and slidable through said housing is a rack bar 22 provided at one end with a rack coacting with the pinion. In the present instance, this bar is, as shown in Figure 3, twisted slightly at its opposite end portion and is formed with a rack 23. I also further employ, in this instance, a bracket 24 which is secured to the side bar 16 of the vehicle frame and is provided with an arm 25 beneath which is a second arm 26 carrying a guide member 27 slidably receiving the forward end of the rack bar. Bolted at one end to the engine of the vehicle is a bracket 28 provided at its opposite end with a sleeve 29 surrounding the steering post 15 and extending from said sleeve is an arm 30 embodying a bearing sleeve 31 and a second bearing sleeve 32.

Journaled at one end through the sleeve 32 and at its opposite end upon the arm 26 of the bracket 24, is a shaft 33 carrying a beveled gear 34 at its forward end and at its rear end a pinion 35 meshing with the rack 23 of the rack bar 22. The throttle control rod of the vehicle is indicated at 36. At its upper end, this rod carries a lever 37 while at its lower end, the rod is journaled through the sleeve 31. Extending through the rod 36 is a rotatable selector setting rod 38 provided at its upper end with a lever 39 cooperating with a quadrant 40 and mounted upon the lower end of the rod 38 is a beveled gear 41 meshing with the gear 34. Thus, as will be seen, the lever 39 may be swung for rotating the shaft 33 when the pinion 35 will coact with the rack 23 of the bar 22 for shifting said bar longitudinally and rotating the pinion 20 to effect a corresponding rotation of the shaft 19.

Splined upon the selector shaft 19 are oppositely presented cylindrical selectors 42 and 43 provided at their inner ends with annular grooves or chanels 44 and formed on the casing 10 at one side thereof is a chamber 45 through the top and bottom walls of which are journaled shafts 46 and 47. Mounted to rock upon said shafts are levers 48 provided at their free ends, as shown in Figure 6, with depending studs 49 engaging in the channels 44 while upon the hubs of the levers are formed meshing sectors 50 connecting the levers to swing in opposite directions simultaneously. Slidable upon the rods 18 are companion gear shifters 51 and 52 provided at their ends with sleeves 53 slidably receiving the rods therethrough and depending from said shifters into the transmission housing 12 are forks 54 coacting with the usual sliding gears of the transmission. Projecting laterally from the shifters medially thereof between the inner ends of the selectors 42 and 43 are forks 55 freely straddling the shaft 19 and mounted upon the shifters at said forks are, as shown in Figure 4, spring pressed detents 56 engageable in sockets 57 in the rods 18 for yieldably locking the shifters in neutral position. Mounted upon the sleeves 53 of the shifters are spring pressed coupling plungers or pawls comprising a low speed plunger 58, a second speed plunger 59, a high speed plunger 60, and a reverse plunger 61. As shown in detail in Figure 7, the plungers are formed with shanks 62 slidable in suitable recesses in the sleeves, which recesses accommodate springs 63 bearing behind the plungers. In the present instance, the plungers are formed with oblong heads having curved faces to bear against the selectors 42 and 43 and formed in the sleeves 53 to accommodate said heads are recesses 64. Locking the plungers against rotation are studs 65 upstanding from the plungers to slidably engage in slots 66 extending inwardly from the recesses 64. Formed in the periphery of the selector 42 are, as shown in detail in Figure 4ª, circumferentially spaced sockets comprising a low speed socket 67 to receive the head of the plunger 58 and a high speed socket 68 to receive the head of the plunger 60. Formed in the periphery of the selector 43 are, as shown in Figure 7, similar sockets comprising a reverse socket 69 to receive the head of the plunger 61 and a second speed socket 70 to receive the head of the plunger 59. All of these sockets are staggered with respect to each other and, as will be noted, the side walls of the sockets slope circumferentially of the selectors to the surface thereof in conformity with the curved end faces of the heads of the plungers so that the plunger heads will seat flat in said sockets while, at the same time, the heads will readily ride out of the sockets upon rotation of the selectors. As shown in dotted lines in Figure 5, the high and second speed sockets 68 and 70 are elongated to accommodate sliding movement of the plungers 59 and 60 endwise of the selectors since in most vehicle transmissions, the movement of the sliding gears for second and high is not as long as for low and reverse. However, since the endwise travel of the selectors 42 and 43 must be constant for the obtaining of the different speed gears, said travel is determined by the throw necessary for the longest movement of the sliding gears. The shortest shifting movement of the sliding gears is accordingly taken care of by elongating said sockets.

In accordance with the present improvements, I employ, in conjunction with one of the shifters 46 and 47, in this instance the sifter 46, a pair of coacting actuating levers comprising a neutral shifter lever 71 and a mating power lever 72. As shown in Figure 13, the lever 71 is formed with a hub 73 while the lever 72 is provided with a hub 74 fitting through the hub 73 journaling the lever 71 as well as also fitting the shaft 46 to which the hub 74 is keyed or otherwise secured. Thus, the lever 72 is connected with the shaft 46 for rotating the shaft while the lever 71 is mounted to swing independently of the shaft, the lever 72 overlying the lever 71. Formed on the hub of the lever 71 is a segment 75 provided at its radial edges with upstanding spacing and reinforcing ribs 76 and 77 and formed on the lever 72 is an overlying segment 78 provided at its curved edge with an arcuate spacing and reinforcing rib 79. At its inner edge, the rib 79 is, as most clearly shown in Figure 9, cut away to define a curved face 80 at the forward end of which is a stop shoulder 81. Journaled through the segment 75 of the lever 71 is a stub shaft 82 to the upper end of which is fixed a pawl 83 which is freely received between the segments 75 and 78 to cooperate with the curved face 80 and shoulder 81 of the rib 79 of the lever 72, and fixed to the lower end of said shaft is an arm or trip member 84 disposed to engage a stud or pin 85 upstanding from the casing 10. Mounted upon the segment 75 behind the trip member is a spring 86 bearing at its free end against said member for normally holding the pawl 83 against the face 80. Upstanding from the housing 21 at the rear end of the casing 10 is a post 87 to which is connected at one end a power spring 88, engaged at its opposite end with the outer end of the lever 72, and upstanding from the casing 10 in the rear of the lever is a stop member 89 for limiting the lever in its rearward movement under the influence of said spring. Mounted to rock upon the arm 25 of the bracket 24 is, as shown in Figure 1, a lever 90 connected at one end with the outer end of the lever 71 by a rod 91 carrying adjustable yokes 92, and connected by a yoke 93 with the opposite end of said lever is a rod 94 adjustably mounted in the yoke. Fixed to the clutch pedal 14 is, as seen in Figure 2, a yoke 95 having a stem 96 provided with a ball head and formed on the forward end of the rod 94 is a socket 97 accommodating said head pivotally connecting the rod with the pedal.

As will now be seen, when the clutch pedal 14 is released, as shown in Figure 2, the spring 88 will act upon the lever 72 for swinging the lever rearwardly and consequently swinging the free ends of the levers 48 apart so that the selectors 42 and 43 will normally occupy the positions shown in Figure 5. On the other hand, the gear shifters 51 and 52 will normally occupy the centralized position shown in Figure 4, when the gears of the transmission will be in neutral. Under such condition, it will be assumed that the hand lever 39 is swingingly set for turning the shaft 19, as previously described, and rotating the selectors 42 and 43 to select the second speed gear. When the lever is thus set, the selectors will be turned until the socket 70 of the selector 43 is disposed in horizontal alinement with the plunger 59 of the shifter 51. Accordingly, when the lever 72 is swung forwardly by the clutch pedal 14, as shall be later explained, the spring 88 will be tensioned while the free ends of the levers 48 will, as shown in Figure 4, be swung toward each other for shifting the selectors 42 and 43 toward each other along the shaft 19. Thus, when the selectors reach the limit of their inward movement, the plunger 59 will, as shown in Figure 7, drop into the socket 70 of the selector 43 coupling the shifter 51 with said selector so that when the lever 72 is freed for return movement, as shall also be later explained, the spring 88 will swing said lever rearwardly with the result that the free ends of the levers 48 will be swung apart for shifting the selectors away from each other along the shaft 19 and moving the shifter 51 rearwardly to engage the second speed gear, the fork 54 of said shifter functioning to slide the gear to active position. The spring 88 will then, of course, serve to hold the gear active. In like manner, the hand lever 39 may be set for selecting the low speed gear of the transmission, the high speed gear, or the reverse gear, or may be set at neutral, when no one of the sockets of the selectors will be in alinement with any of the plungers. In the latter event, no gear will, as will be perceived, be shifted to active position incident to spreading or outward movement of the selectors under the action of the spring 88, and since the sockets of the selectors are all staggered with respect to each other while the plungers of the shifters 51 and 52 lie in a plane common thereto, it will be impossible to set the selectors in such manner that any two of the sockets will be brought into alinement with any two of the plungers at the same time. Accordingly, it will be impossible to select more than one gear at any one setting of the hand lever 39. When either of the shifters 42 or 43 is moved for rendering one of the speed gears of the transmission active, the other of said shifters will, as shown in Figure 5, remain in neutral position, held against undesired endwise movement by its detent 56.

Assuming that one of the speed gears of the transmission is active, as for instance, the second speed gear, it is to be noted that even though the plunger 59 is engaged in the socket 70 of the selector 43, the hand lever 39 may, nevertheless, be set for selecting another speed gear of the transmission. When the hand lever is thus set and the selectors are rotated, the plunger 59 will ride over the curved bottom wall of said socket onto the surface of the selector uncoupling the shifter 51 from said selector. However, when the lever 72 is then swung forwardly by the clutch pedal 14 for tensioning the spring 88 to effect the subsequent shifting of the gear selected, the inner end of the selector 43 will, as the selectors are moved toward each other to the position shown in Figure 4, coact with the fork 55 of said shifter for returning the shifter to neutral position. A like result would follow in connection with the selector 42 and shifter 52 under similar circumstances. Consequently, before any gear selected can be shifted to active position, any gear previously selected, or the second speed gear in the instance taken, will be neutralized.

Referring now particularly to Figures 8 to 12 inclusive, of the drawings, it will be seen that when the clutch pedal 14 is released, as shown in Figure 2, and the clutch 13 is engaged, the levers 71 and 72 will occupy the relative positions shown by Figure 8, the pawl 83 standing away from the shoulder 81. Accordingly, the lever 71 may be swung forwardly independently of the lever 72 until the pawl strikes the shoulder so that the foot pedal may thus be rocked forwardly the necessary distance for disengaging the clutch 13 without movement of the lever 72 to effect the speed gears. However, upon further forward movement of the clutch pedal, the pawl 83 will, as shown in Figure 9, coact with the shoulder 81 for connecting the levers to swing in unison so that as the movement of the clutch pedal is continued, the lever 72 will be swung forwardly for shifting the selectors 42 and 43 toward each other, in the manner previously described, and neutralizing any gear of the transmission previously selected. The clutch pedal may thus, after the clutch has been disengaged, be further shifted forwardly for neutralizing the transmission and tensioning the power spring 88, when, as shown in Figure 10, the trip member 84 will have been moved into engagement with the stud 85. Thus, assuming that the lever 39 has been set to select the desired speed gear, as previously described, it will be seen that when the levers 71 and 72 reach the position of Figure 10, the gear previously active will have been moved to neutral position while the lever 71 will remain connected with the lever 72 through the medium of the pawl 83 so that the lever 72 may be permitted to return, through the action of the spring 88, to normal position under control of the clutch pedal. When the lever 72 is thus permitted to return, the gear selected will, as previously described, be shifted to active position, so that, as will be seen, the operator may, through the medium of the clutch pedal, readily regulate the rapidity of the shifting movement of the selected gear. In the event that any one of the speed gears is active and the lever 39 is not set to select a different gear, the gear active will, when the levers 71 and 72 reach the position of Figure 10, be shifted to neutral position and will then, when the lever 72 is allowed to return under control of the clutch pedal, again be shifted to active position. I thus provide a mechanism whereby a slow shifting of any speed gear being moved may be had.

Assuming now that after the levers 71 and 72 have reached the position of Figure 10, the clutch pedal is further rocked forwardly, it will be seen that the trip member 84 will be advanced against the stud 85 with the result that the trip member will be rocked rearwardly to ride the pawl 83 out of engagement with the shoulder 81. When this occurs, the lever 72 will, of course, be freed from the lever 71 so that the spring 88 will, unhampered, immediately swing the lever 72 rearwardly, as shown in Figure 11, to effect a quick shifting of the gear selected or a reshifting of any gear previously in use in the event that no different gear is selected. Thus, after the operator has pushed the clutch pedal forwardly to effect the neutralizing of the transmission, the operator may exercise the choice of either a slow shift of the gear selected or a quick shift thereof by permitting the pedal to return under the control of the foot in the first instance or by rocking the pedal further forward a slight distance for freeing the lever 72 in the latter instance. After the lever 72 has been freed from the lever 71 and is returned by the spring 88, as shown in Figure 11, the lever 71 will, of course, also be freed for movement independent of the lever 72. Accordingly, it will be seen that the lever 71 may be further rocked forwardly beyond the position of the lever necessary to effect a gear shift, to accommodate the full forward throw of the clutch pedal. Unrestricted movement of the clutch pedal is thus obtained while, at the same time, a shifting of any gear selected may be had incident to such movement. Upon the release of the clutch, the lever 71 will, of course, be returned to the position of Figure 8, when the parts will be again set ready for a repetition of the forward movement of said lever.

Having thus described the invention, what is claimed as new is:

1. Mechanism of the character described including coacting independently movable levers formed with confronting segments and provided with hubs, the hub of one lever being journaled upon the hub of the other, a shaft journaled through the segment of the latter lever, the segment of the former lever being provided with a shoulder, a pawl carried by one end of said shaft between the segments to engage said shoulder coupling the levers to swing in unison, and a trip member carried by the opposite end of said shaft for rotating the shaft and swinging the pawl out of engagement with said shoulder.

2. Mechanism of the character described including coacting pivotally and independently movable levers free with respect to each other and having confronting segments, the segment of one of said levers being provided with a shoulder, and means carried by the segment of the other of said levers to coact with said shoulder for coupling the levers to swing in unison, one of the levers being provided with a portion journaling the other of said levers.

3. Mechanism of the character described including coacting pivotally and independently movable levers free with respect to each other and having confronting segments, the segment of one of said levers being provided with a shoulder, a shaft journalled through the segment of the other lever, a pawl carried by said shaft to coact with said shoulder for coupling the levers to swing in unison, and a trip member carried by the shaft and operable to rock said shaft and swing the pawl out of engagement with said shoulder.

4. Mechanism of the character described including coacting pivotally and independently movable levers free with respect to each other, yieldable means tending to swing one of said levers in one direction, a stationary anchor for said means, means for swinging the other of said levers in the opposite direction, and means housed between the levers for releasably coupling the former lever with the latter lever to swing therewith, one of the levers being provided with a portion journaling the other of said levers.

5. Mechanism of the character described including coacting independently movable levers free with respect to each other, means pivotally mounting the levers near the inner ends thereof, yieldable means connected to one of said levers near its outer end for swinging such lever in one direction, means connected with the other of said levers near its outer end for swinging the latter lever in the opposite direction, and means housed between the intermediate portions of the levers for releasably coupling the former lever with the latter lever to swing therewith, one of the levers being provided with a portion journaling the other of said levers.

In testimony whereof I affix my signature.

GLENN T. RANDOL. [L. S.]